United States Patent [19]

Maeda

[11] Patent Number: 4,787,355

[45] Date of Patent: Nov. 29, 1988

[54] CRANK ANGLE DETECTING SYSTEM FOR AN INTERNAL COMBUSTION ENGINE

[75] Inventor: Satoshi Maeda, Tokyo, Japan

[73] Assignee: Fuji Jukogyo Kabushiki Kaisha, Tokyo, Japan

[21] Appl. No.: 152,615

[22] Filed: Feb. 5, 1988

[30] Foreign Application Priority Data

Feb. 13, 1987 [JP] Japan .................................. 62-032140

[51] Int. Cl.$^4$ ............................................... F02P 5/14
[52] U.S. Cl. ...................................... 123/414; 123/612
[58] Field of Search ............... 123/414, 416, 417, 418, 123/406, 612

[56] References Cited

U.S. PATENT DOCUMENTS

| | | | |
|---|---|---|---|
| 4,615,318 | 10/1986 | Imodo et al. | 123/414 |
| 4,644,917 | 2/1987 | Yakuwa et al. | 123/414 |
| 4,658,786 | 4/1987 | Ross et al. | 123/414 |
| 4,664,082 | 5/1987 | Suzuki | 123/414 |
| 4,690,123 | 9/1987 | Kimura et al. | 123/414 |
| 4,718,395 | 1/1988 | Iwata | 123/414 |

*Primary Examiner*—Raymond A. Nelli
*Attorney, Agent, or Firm*—Martin A. Farber

[57] ABSTRACT

A pulse generator disk is secured to a crankshaft of an engine. The disk has notches representing a compression top dead center of each cylinder. A first magnetic pickup is provided for producing a first output signal in accordance with the notch. A rotary member is secured to a camshaft of the engine. The rotary member has projections provided at positions corresponding to respective cylinders. A second magnetic pickup is provided for producing a second output signal in accordance with the projections. A control system is provided to respond to the first output signal to produce a crank angle signal. When the first output signal does not generate at a proper timing, a crank angle signal is produced dependent on the second output signal.

4 Claims, 6 Drawing Sheets

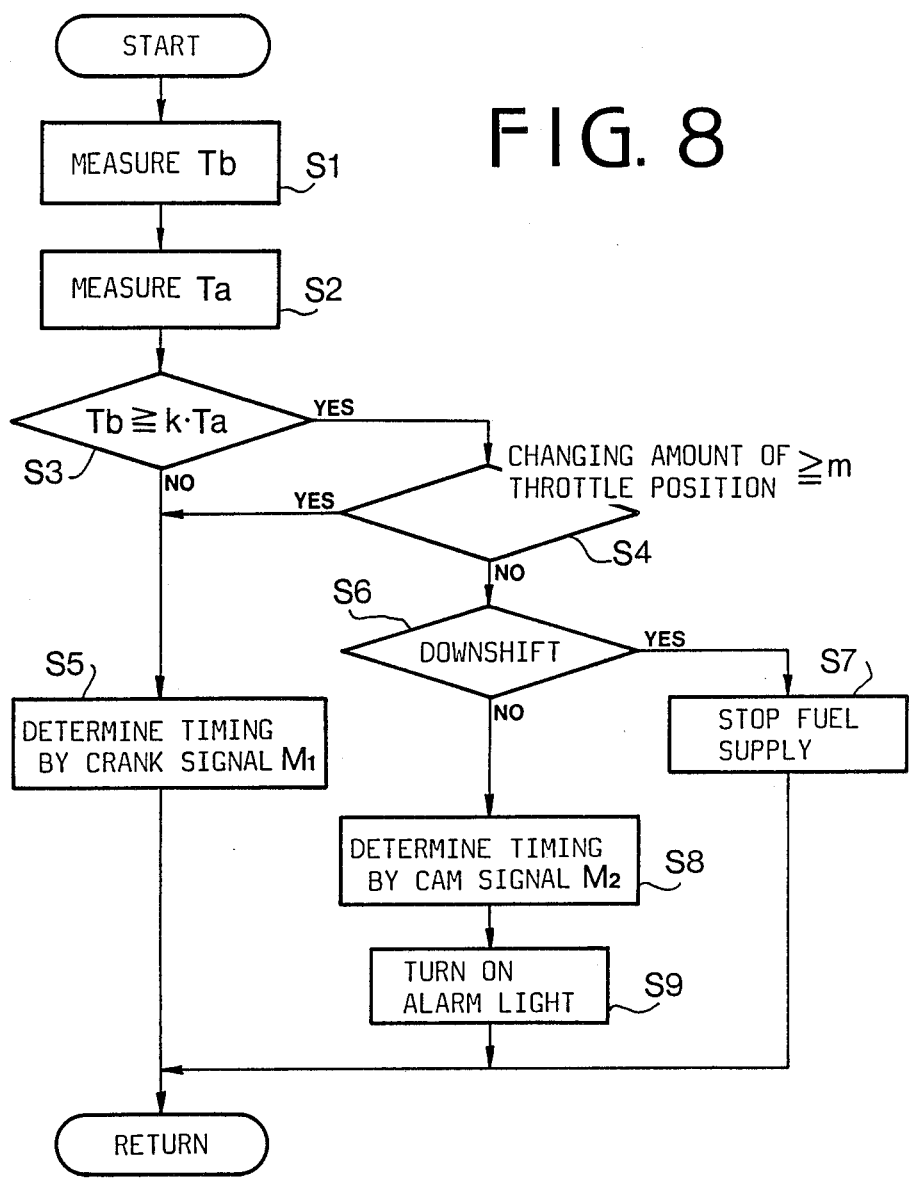

CRANK ANGLE DETECTING SYSTEM FOR AN INTERNAL COMBUSTION ENGINE

BACKGROUND OF THE INVENTION

The present invention relates to a crank angle detecting system for an internal combustion engine for vehicles, and more particularly to a system which detects the crank angle dependent on positions of a crankshaft and a camshaft. The detected crank angle is used for controlling a fuel injection timing and an ignition timing of the engine.

Heretofore various methods for sensing the crank angle have been proposed and used. Japanese Patent Application Laid-Open No. 55-66620 discloses a system in which a crankshaft is provided with a pulley having V-shaped notches on the periphery thereof. The crank angle is determined by sensing the position of the notch. Further, as another method, a system for detecting the crank angle dependent on the position of a camshaft is used.

However, in case of a multi-cylinder engine, the former system can not discriminate the crank angle for each cylinder. As an example of latter system, the crank angle is detected by a rotor plate having slits. The rotor plate is provided in a distributor or secured to the camshaft, and an optical sensing system comprising a light emitting diode and a photo diode is provided for sensing the position of the slit. Such a system entails high manufacturing cost. Furthermore, a timing belt for driving the camshaft may vibrate or deteriorate with time, and will extend or contract by thermal expansion during operation. Accordingly, it is difficult to detect the crank angle accurately.

In order to detect the crank angle accurately, a system in which the crank angle is detected by combining a crank signal obtained by sensing means for detecting the position of the crankshaft and a cam signal obtained by sensing means for the position of the camshaft has been proposed.

In the system, a magnetic pickup used for sensing the position of the crankshaft is soaked in the engine oil inevitably. The magnetic pickup senses metallic foreign particles included in the oil to produce an error signal.

SUMMARY OF THE INVENTION

An object of the present invention is to provide a crank angle detecting system for an automotive engine which may detect the crank angle with accuracy and can discriminate the crank angle for each cylinder of the engine.

Another object of the present invention is to provide a system in which a camshaft signal is used for preventing malfunction, when detector means for the crankshaft produces an error signal.

According to the present invention, there is provided a crank angle detecting system for an internal combustion engine having a plurality of cylinders, comprising a pulse generator disk secured to a crankshaft of said engine and having notches each corresponding to a compression top dead center of the cylinder, a first magnetic pickup for producing a first output signal in accordance with said notch, a rotary member secured to a camshaft of said engine and having projections provided at positions corresponding to respective cylinders, said projections at each position being set to represent a corresponding cylinder, a second magnetic pickup for producing a second output signal in accordance with said projections, first means responsive to said first output signal for producing a crank angle signal, second means for detecting production of an erroneous first output signal and for producing a trouble signal, third means responsive to said trouble signal for producing a crank angle signal in accordance with said second output signal.

In an aspect of the invention, the number of said projections represents a corresponding cylinder, and the second means produces the trouble signal when said first signal does not generate at a proper timing.

The other objects and features of this invention will be apparently understood from the following description with reference to the accompanying drawings.

BRIEF DESCRIPTION OF DRAWINGS

FIG. 8 is a flow chart showing the operation of the control unit.

DETAILED DESCRIPTION OF THE PREFERRED EMBODIMENT

Figure 1:
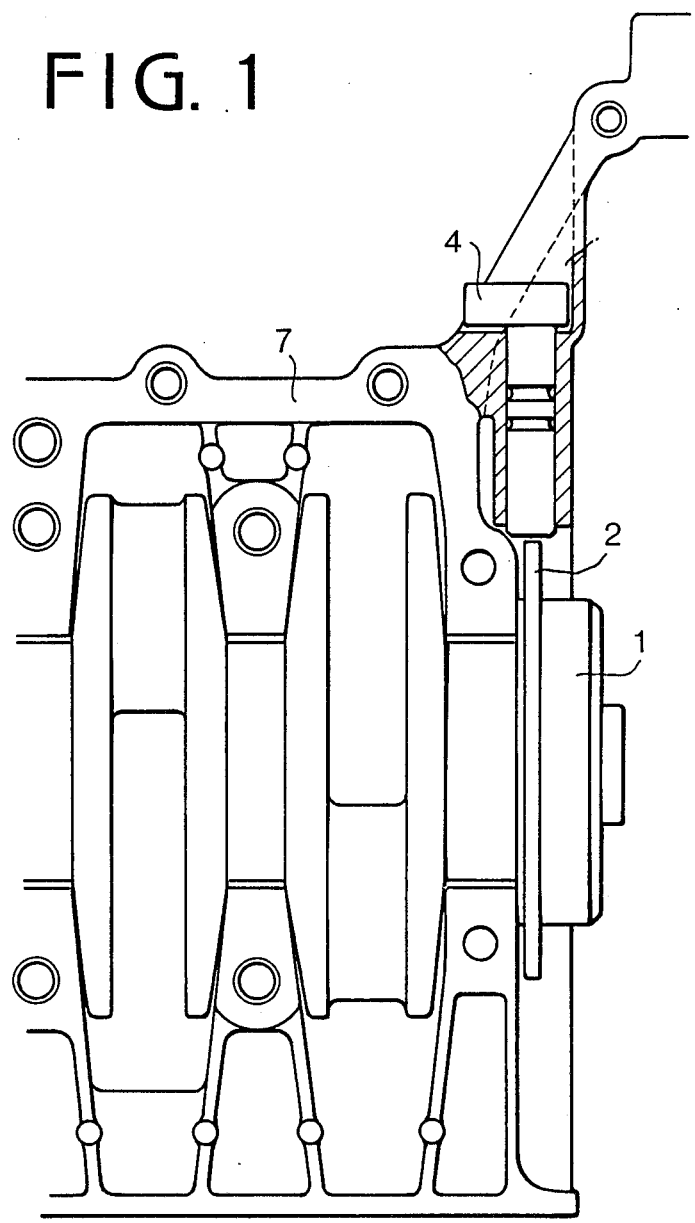
FIG. 1 is a side view showing a part of a crankshaft.
Figure 2:
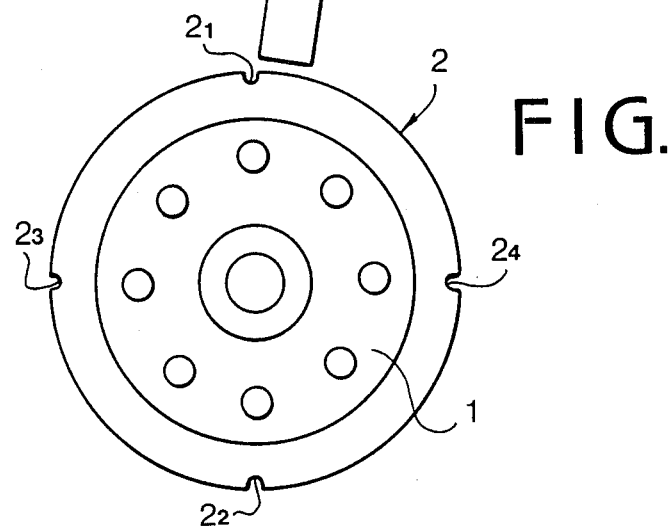
FIG. 2 is a front view of the crankshaft.

Referring to FIGS. 1 and 2, a crankshaft 1 rotatably mounted in a crankcase 7 has a pulse generator disk 2 secured to a rear end thereof. The pulse generator disk 2 has a plurality of notches, for example, in case of the four-cylinder engine, four notches $2_1$, $2_2$, $2_3$, $2_4$ formed on an outer periphery thereof at equal angular intervals (90 degrees). Notches $2_1$, $2_2$, $2_3$, $2_4$ represent compression top dead centers of No. 1 to No. 4 cylinders, respectively. A first magnetic pickup 4 is mounted on the crankcase 7 adjacent the disk 2 for detecting the notches.

Figure 3:
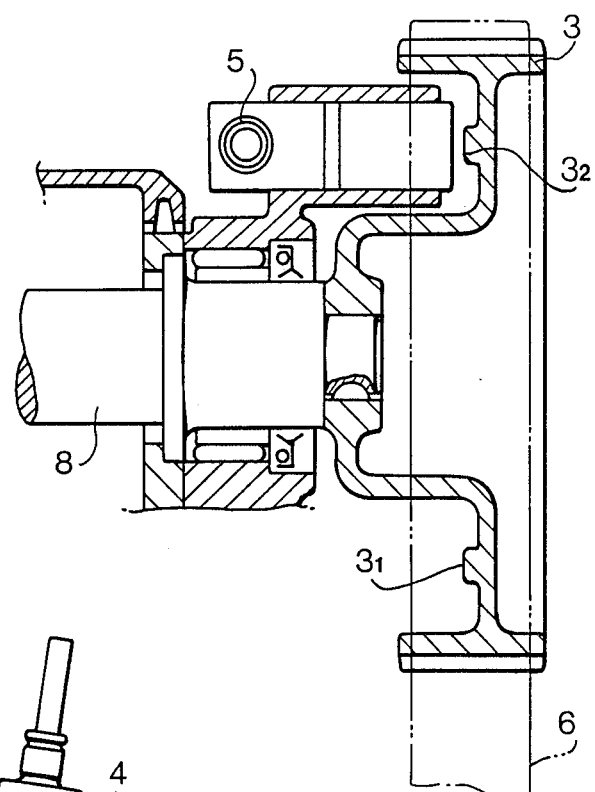
FIG. 3 is a sectional view showing a part of a camshaft.
Figure 4:
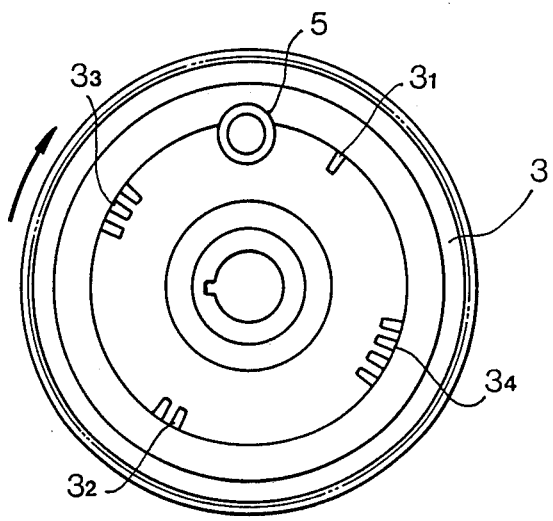
FIG. 4 is a front view of a cam pulley mounted on the camshaft.

Referring to FIGS. 3 and 4, a camshaft pulley 3 secured to a camshaft 8 is connected to a crankshaft pulley (not shown) of the crankshaft 1 through a timing belt 6. The camshaft pulley 3 rotates once when the pulse generator disk 2 rotates twice. The camshaft pulley 3 is provided with toothed portions $3_1$, $3_2$, $3_3$, $3_4$ formed on a side thereof. As shown in FIG. 4, the toothed portion $3_1$ has one projection, toothed portion $3_2$ has two projections, portion $3_3$ three projections, and portion $3_4$ four projections. Therefore, the toothed portions $3_1$ to $3_4$ represent No. 1 to No. 4 cylinders, respectively. Toothed portions $3_1$ to $3_4$ are disposed at regular angular intervals on the side of the pulley 3 and positioned according to the firing order of the engine. A second magnetic pickup 5 is provided adjacent the side of the camshaft pulley 3 for detecting the toothed portions.

Figure 5:
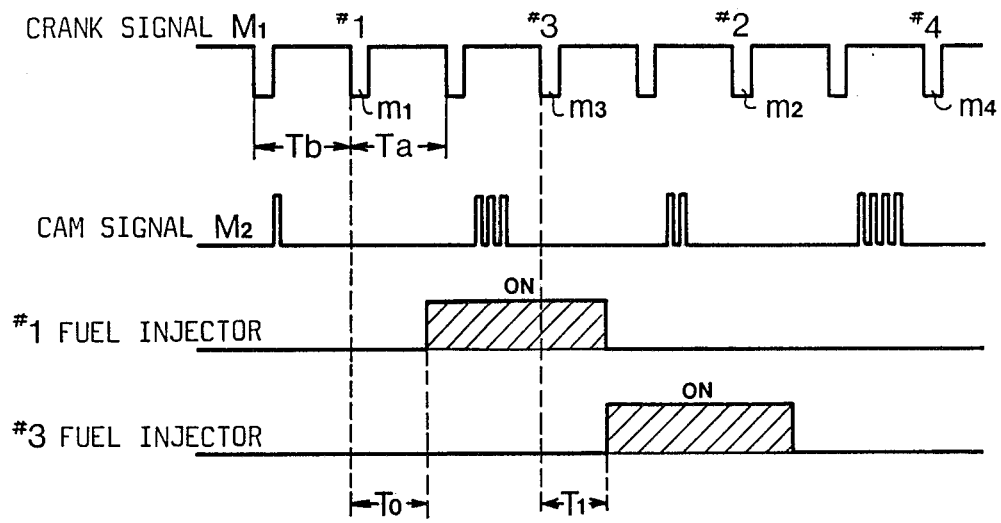
FIG. 5 is a diagram showing injection timing in relation to a crank signal and a cam signal at abnormal state.

When the pulse generator disk 2 rotates, the first magnetic pickup 4 detects positions of notches $2_1$ to $2_4$ and produces crank signals M1 in the form of pulses as shown in FIG. 5. When the camshaft pulley 3 is rotated by the crankshaft 1 through the timing belt 6, second magnetic pickup 5 detects toothed portions $3_1$ to $3_4$ to produce cam signals M2 in the form of pulses a shown in FIG. 5.

The number of cylinder and a top dead center of the corresponding cylinder are discriminated by the combination of the crank signal M1 and the cam signal M2. That is to say, a crank angle signal m1 after the one-pulse signal of the cam signal M2 represents the top dead center of the No. 1 cylinder, a crank angle signal m3 after the three-pulse signal represents a top dead center of the No. 3 cylinder. Similarly, a crank angle signal m2 represents the No. 2 cylinder and a crank angle signal m4 represents No. 4 cylinder. The detected crank angle is used for determining the timings of various operations of the engine, such as ignition timing and fuel injection timing.

Each of injection timings of fuel injectors of the No. 1 to No. 4 cylinders is determined by a predetermined angular displacement from the crank angle signal M1. As shown in FIG. 5, injection timing of the No. 1 cylinder is set at a predetermined angle (delay time To) from the crank signal m1. Injection timing of the No. 3 cylinder is set at a predetermined angle (delay time T1) from the crank signal m3.

Figure 7:
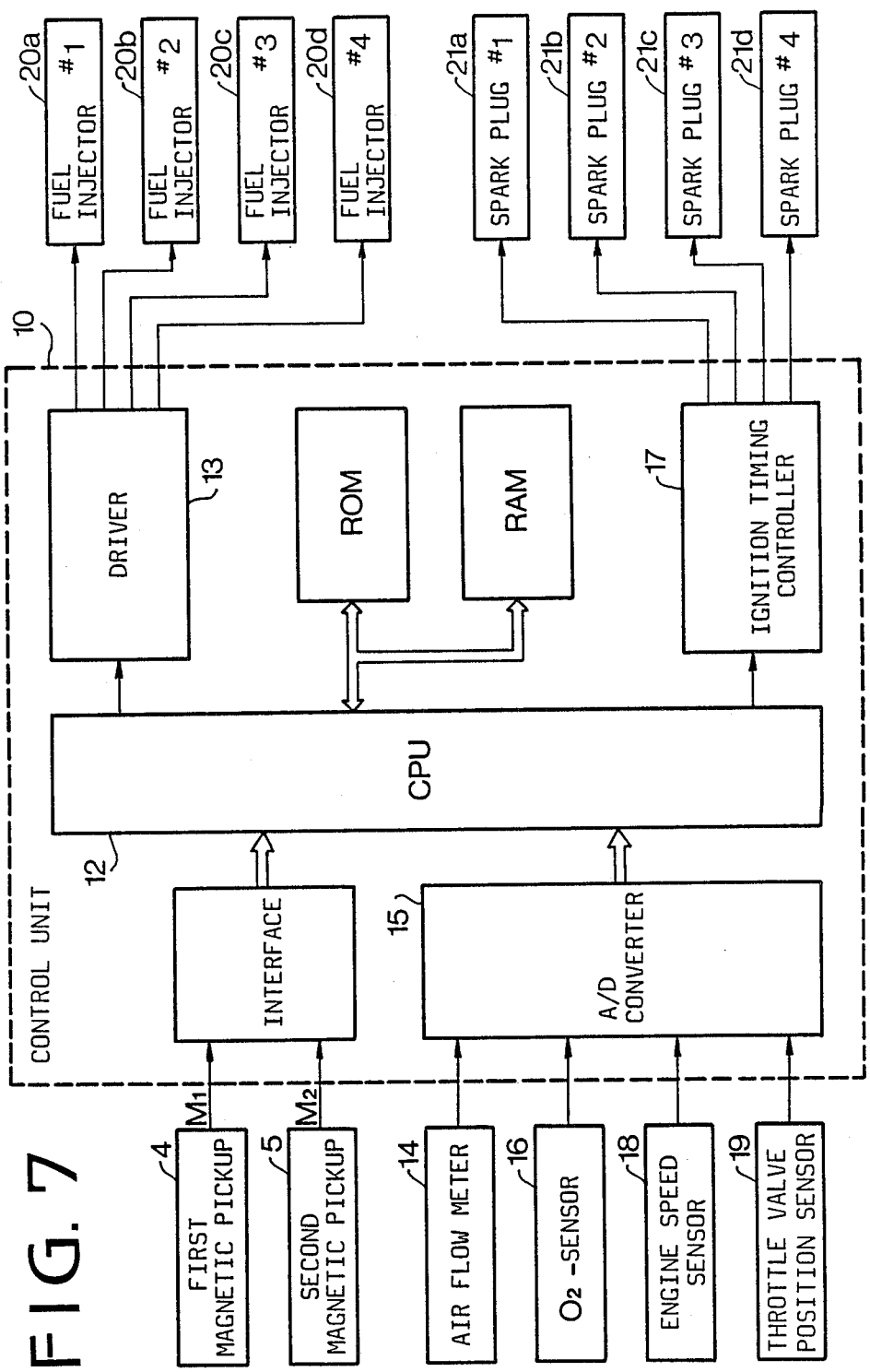
FIG. 7 is a block diagram of a control unit used in a system according to the present invention.

Referring to FIG. 7, a control unit 10 is provided for controlling a fuel injection timing and an ignition timing. The control unit 10 comprises a CPU 12 having a ROM and a RAM. The crank signal M1 of the first magnetic pickup 4 and the cam signal M2 of the second magnetic pickup 5 are applied to an interface and an output signal thereof is applied to CPU 12 for determining the timing of compression top dead center of each cylinder. The system has an air flow meter 14 for measuring air flow passing in an intake passage of the engine, an $O_2$-sensor for detecting oxygen concentration in exhaust gases, an engine speed sensor 18, and a throttle valve position sensor 19. Signals of air flow meter 14, $O_2$-sensor 16, engine speed sensor 18, and throttle valve position sensor 19 are applied to CPU 12 through an A/D converter 15. CPU 12 calculates a fuel injection pulse width and fuel injection timing to be supplied to cylinders in accordance with input signals dependent on operating conditions of the engine, and produces a control signal which is applied to fuel injectors 20a to 20d through a driver 13. Further, ignition timing is obtained based on the crank signal M1 with a time delay and a timing signal is sent to an ignition timing controller 17. The controller 17 produces a signal in response to the timing signal of CPU 12 for energizing ignition coils of spark plugs 21a to 21d of No. 1 to No. 4 cylinders.

Figure 6:
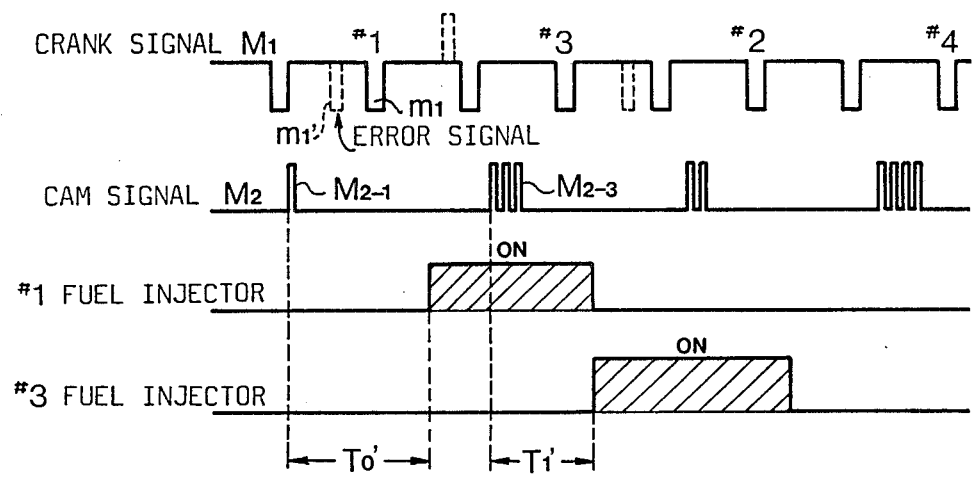
FIG. 6 is a diagram showing injection timing in relation to the crank signal and the cam signal at normal state.

Further, the control unit monitors the angular interval of the crank signal M1. When the crank signal M1 does not generate at a predetermined interval, the cam signal M2 is substituted for the crank signal for determining the crank angle and the injection timing. For example, as shown in FIG. 6, if the crank signal m1 does not generate at a regular timing, but generates at timing m1', the injector of the No. 1 cylinder is operated at a proper timing with a delay To' after a signal M2-1 of the cam signal M2. The injector of the No. 3 cylinder is turned on at a predetermined delay T1' after the signal M2-3 of the cam signal M2.

Accordingly, in abnormal state, the number of cylinder and the top dead center of the corresponding cylinder are discriminated by the cam signal. Namely, the one-pulse signal of the cam signal M2 represents the top dead center of the No. 1 cylinder and the three-pulse signal of the cam signal M2 represents the top dead center of the No. 3 cylinder. In the system, the provision of the respective intervals and injection timing is performed by a timer or counter provided in the control unit 10.

The operation of the control unit for detecting and processing an error signal will be described hereinafter with reference to the diagram and the flow chart of FIGS. 6 and 8.

In normally operated state, intervals Tb and Ta of the crank signals M1 are measured at steps S1 and S2, respectively. At a step S3, the last interval Tb is compared with k·Ta (Ta is a present interval, k is a constant) to determine whether Tb≧k·Ta or not. When Tb is smaller than k·Ta, it is determined that the signal m1 generates at a proper timing, and the program goes to a step S5. At the step S5, injector 20a of the No. 1 cylinder is operated at an injection timing dependent on the crank signal m1 as shown in FIG. 5. When Tb≧k·Ta, the program proceeds to a step S4 where it is determined whether the throttle valve is rapidly and largely opened at the time when the interval Ta becomes rapidly small. If the engine is rapidly accelerated, the amount of the throttle position change becomes larger than a predetermined value m. Accordingly, the crank signal M1 is not erroneously produced. Therefore, the program goes to the step S5 for the normal injection timing operation. On the other hand, when the transmission of the vehicle is downshifted and the accelerator pedal is released to effect engine braking, engine speed rapidly increases.

Accordingly, the interval Ta becomes rapidly small in spite of the amount of the throttle position change being smaller than the value m. Therefore, if the amount of the throttle position change is smaller than the predetermined value m, the program proceeds to a step S6, where it is determined whether the transmission is downshifted. When the transmission is downshifted, the program goes to a step S7 where the fuel is cut off. When the transmission is not downshifted, it is determined that an error crank signal M1 produces, and the program proceeds to a step S8. At the step S8, the injection timing is determined in accordance with the cam signal M2 as shown in FIG. 6. At a step S9, an alarm light is turned on to indicate abnormal state.

In the system of the present invention, a timing signal is basically determined by the crank signal M1, and when the crank signal M1 does not generate at a set timing, the cam signal M2 is substituted for the crank signal M1. Thus, proper crank angle can be detected. Further, it is not necessary to provide a special system for the substitution control so that the system is simplified in construction and operation. Since the crank angle is detected by the combination of the crank signal and camshaft signal, an accurate detection can be obtained, with the discrimination of cylinders.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A crank angle detecting system for an internal combustion engine having a plurality of cylinders, comprising:

a pulse generator disk secured to a crankshaft of said engine and having notches each corresponding to a compression top dead center of the cylinders, a first magnetic pickup for producing a first output signal in accordance with said notch;

a rotary member secured to a camshaft of said engine and having projections provided at positions corresponding to respective cylinders, said projections at each position being set to represent a corresponding cylinder, a second magnetic pickup for producing a second output signal in accordance with said projections;

first means responsive to said first output signal for producing a crank angle signal;

second means for detecting production of an erroneous first output signal and for producing a trouble signal;

third means responsive to said trouble signal for producing a crank angle signal in accordance with said second output signal.

2. The system according to claim 1 wherein said rotary member is a cam pulley secured to said camshaft.

3. The system according to claim 1 wherein the number of said projections represents a corresponding cylinder.

4. The system according to claim 1 wherein the second means produces the trouble signal when said first signal does not generate at a proper timing.

* * * * *